July 3, 1962     L. C. CROME     3,042,513
PRODUCTION OF NODULAR IRON
Filed Dec. 11, 1958
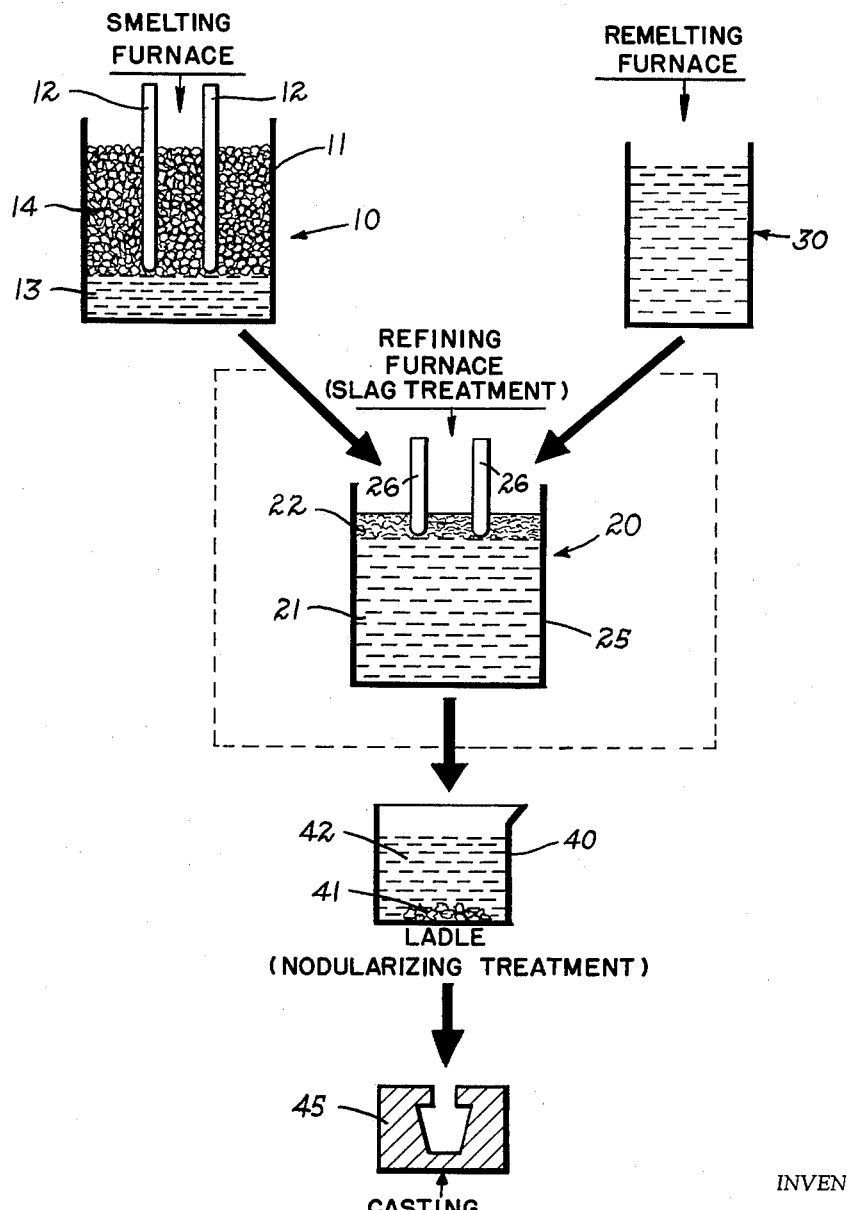
INVENTOR.
LESTER C. CROME
BY
Marshal, Biebel, French & Bugg
ATTORNEYS United States Patent Office 3,042,513
Patented July 3, 1962

3,042,513
PRODUCTION OF NODULAR IRON
Lester C. Crome, West Alexandria, Ohio, assignor to The Dayton Malleable Iron Company, Dayton, Ohio, a corporation of Ohio
Filed Dec. 11, 1958, Ser. No. 779,760
4 Claims. (Cl. 75—130)

This invention relates to the production of nodular iron (as this term is presently understood as including an as-cast iron product of an originally essentially grey iron mix in which the graphitic carbon content thereof is precipitated in the form of nodules or spherulites instead of in the form of flake graphite) and, more particularly, to the production of such nodular iron castings from an iron melt which is particularly susceptible to nodularization by virtue of having been prepared from iron ore by a direct reduction technique or process instead of through the conventional blast furnace process for the production of conventional pig iron.

The production of nodular iron castings from various types of pig iron melts by various ones of the now well known nodularizing techniques has disclosed that various types of pig irons may react in different ways and to different degrees when it is attempted to produce a nodular iron casting from a remelt of the pig iron by the ladle addition thereto of any one of a number of known and now conventional nodularizing agents. It has also been observed that pig irons generally vary widely in their responsiveness to treatment by a nodularizing agent, and that such variation appears to be a function of a number of factors including, among others, the particular type of iron ore used to produce the original pig (particularly, in terms of the region from which it is obtained), the composition of the pig iron which is remelted to form the iron mix intended to be nodularized, the type of melting or remelting equipment utilized in the production from pig iron or scrap of the molten mix desired to be nodularized, and, of course, the particular composition of the melt and pretreatment thereof before nodularization, with, naturally, the particular type of nodularizing agent utilized.

More particularly, it has been discovered that certain pig starting materials (and/or, of course, certain particular ores from which they may be derived and/or certain particular treatments of such pig irons during the original blasting or smelting thereof as well as during later remelting treatment) produce widely varying responsiveness to nodularizing, which variations may, indeed, be beyond desirable or economically effective limits of control or compensation during remelting or ladle addition steps in the production of nodular iron castings. Such a situation, of course, may form a significant economic or commercial consideration in the production of nodular iron, particularly in highly competitive situations where the amount of additive of nodularizing material, of whatever sort, may become competitively determinative of the costs involved and, moreover, where the amount of additive material may be significantly determined by the inherent responsiveness of the iron melt being treated to nodularizing agents.

According to the present invention a system is provided for the production of nodular iron from a molten iron mix rendered particularly responsive to nodularizing treatment, which mix is prepared by the direct reduction of the iron from iron ore and the treatment thereof with a calcium slag for the direct or immediate production of a molten iron mix particularly susceptible to nodularization and/or the production of iron pigs for later remelting to form a molten iron mix particularly susceptible to nodularization.

One object of this invention is to provide a molten iron mix particularly susceptible to a nodularizing treatment or addition of nodularizing agent, which mix is prepared directly in molten form from iron ore.

Another object of this invention is to provide, in a nodular iron producing system of the character described, means and methods for producing, in immediately molten or remeltable form, a gray iron mix of enhanced nodularizing responsiveness for melting and ladle addition treatment with a nodularizing agent to form a nodular iron casting, said iron mix being produced by the direct reduction of iron ore in the absence of conventional blast furnace techniques.

A further object of this invention is to provide, in a nodular iron producing method of the character described, process steps and apparatus for the direct reduction of various iron ores to form directly a nodularizeable molten iron mix of enhanced responsiveness and susceptibility to the nodularizing action of a variety of nodularizing agents in ladle additions thereof prior to casting.

Still another object of this invention is to provide, in a nodular iron producing method of the character described, process steps and apparatus for the direct reduction of various iron ores to form directly a nodularizeable molten iron mix of enhanced responsiveness and susceptibility to the nodularizing action of a variety of nodularizing agents in ladle additions thereof prior to casting, and also including, after direct reduction of said ores, a calcium slag pretreatment for further enhancing the responsiveness of said iron to said nodularizing treatment.

A still further object of this invention is to provide nodular iron castings of the character described, prepared with substantially enhanced efficiency and substantially decreased addition of a nodularizing agent immediately prior to casting, from a molten pig iron mix derived directly from the direct reduction of iron ores in the absence of conventional blast furnace techniques and, thereafter, with a calcium slag pretreatment for still further enhancing the responsiveness of said melt to nodularizing action, whereby said nodular castings are produced with substantially less nodularizing agent addition and with substantially enhanced efficiency in the utilization thereof.

Still another object of this invention is to provide, in nodualr iron producing systems of the character described, methods and apparatus for the continuous production of a molten iron mix of enhanced responsiveness to a nodularizing addition treatment, with said mix being produced in a continuous process from the direct reduction and treatment of iron ore continuously introduced into the system providing for a nodular-responsive mix for continuous withdrawing for founding and casting into remeltable pigs and/or nodular treated iron castings.

Other objects and advantages will be apparent from the following description, the accompanying drawing, and the appended claims.

In the drawing, a more or less diagrammatic flow sheet type of showing is depicted indicating an arrangement of process steps and apparatus embodying and for practising this invention.

Referring to the drawing, in which a preferred embodiment of this invention is depicted, the more or less diagrammatic flow sheet showing there indicates the steps and apparatus utilized in connection with the direct reduction from iron ore itself of a particularly responsive iron melt for nodularizing treatment in accordance with this invention. A smelting furnace is indicated diagrammatically at 10 as including a container 11 of conventional construction and a pair of arc members 12 for energization in conventional manner (from a source of electric power not shown) to provide melting and smelting energy for the arc furnace. Also, preferably, a layer of molten melt is shown at 13 in the bottom portion of furnace 10 and at least deep enough to contact the lower ends of arc electrodes 12 to form an extensive and conductive reservoir of heat energy as generated by electrodes 12 and in conjunction therewith to, in the preferable situation, enhance uniformly the heating effect of the arcs from electrodes 12 in the absence of concentrated direct arc heating of the ore charge itself. Also diagrammatically illustrated by the layer 14 above molten metal 13 is a charge of iron ore, preferably in more or less finely divided form, which layer of iron ore is, as will be understood, admixed with coke or coal or other reducing material and an appropriate smelting slag for the direct reduction of molten iron from the ore layer 14 in arc furnace 10.

As will be understood, particularly for continuous operation, the residium layer 13 of molten metal retained in the bottom of the smelting furnace 10 may constantly be maintained there as additional ore is added to the top of the layer 14 and as reduced or as molten iron is tapped out of the lower portion of the furnace in conventional manner. Preferably, upon reduction of the molten metal from the ore, the molten metal is tapped from smelting furnace 10 into a refining furnace 20 for further treatment—although, as will be understood by a man skilled in this art, both the steps of smelting or direct reduction and refining may satisfactorily be undertaken in a single furnace, even for continuous operation, although the use of an additional furnace 20 is preferred according to this invention.

In refining furnace 20, to which molten and reduced iron is tapped in known manner from smelting furnace 10 and to form a layer indicated at 21, the responsiveness of the directly reduced molten metal in layer 21 may be enhanced by treatment thereof with a calcium slag, indicated generally and diagrammatically by layer 22, and such calcium slag treatment preferably embodies the compositions and teachings disclosed in the copending application of Lester C. Crome, Serial No. 641,870, filed February 25, 1957, although other slag materials may be used provided that the stone or carbonate or oxide component thereof is high in calcium content rather than being a high-magnesium stone, for example. As will be understood, refining furnace 20, is, also, preferably a direct arc furnace, including a conventional container 25 for such furnaces and energy input electrodes 26 energized from a source of electric current in known manner (but not shown). Particularly with regard to a continuous commercial foundry operation in which a large number of castings are to be produced, each of which will have substantial sprue formation from conventional gates, risers, etc., as is conventional in ferrous foundry practice, an ancillary remelting furnace 30 is preferably provided (as an arc furnace or cupola, or other device) for the remelting of sprue from previous casting runs and the adding of the remelted metal to that produced in refining furnace 20.

As noted above, the directly reduced molten mix is preferably introduced into refining furnace 20 from smelting furnace 10 and along with the remelted sprue from remelting furnace 30 in known manner for retention in the molten state in refining furnace 20 and treatment with the slag composition layer 22 generally in accordance with the teachings of said copending application, although, as will be understood, with various ores and because of the controlled direct reduction technique embodying and for practicing this invention, the composition of directly reduced metal in smelting furnace 10 may be such that a slag treatment and/or retention in a separate refining furnace 20 is either unnecessary or economically undesirable prior to the ultimate and desired nodularizing addition treatment for the production of nodular castings according to this invention.

The molten and nodularizing-responsive metal from smelting furnace 10 (with or without the optionally extra treatment in refining furnace 20 and with or without addition thereto of nodular sprue remelted in furnace 30) is, then, tapped into a conventional ladle, in known manner, as indicated in the drawing at 40. As will be understood, it is in ladle 40 that the nodularizing treatment or addition of nodularizing material is accomplished as diagrammatically indicated in the drawing by nodularizing material 41 shown in the bottom of ladle 40 on top of which is tapped, in known manner, a layer 42 of molten prepared nodular-responsive iron mix.

As will be understood from the foregoing, whether the nodularizing treatment in ladle 40 involves the addition to molten metal 42 of mischmetal, magnesium, combinations thereof, calcium nodularizing agents, or other suggested or known or conventional or new nodularizing addition agents, nevertheless, the direct reduction of molten metal from ore in smelting furnace 10 (with or without the additional calcium or other slag treatment indicated in refining furnace 20 and, of course, with or without any desired adjustments or variations of the various constituents or proportions of molten material 42) satisfactorily results in a molten mix of enhanced responsiveness to the desired nodularizing ladle addition or treatment in ladle 40, after which the treated or nodularized metal is poured, in known manner, from ladle 40 into one or more molds, indicated at 45, to form the desired nodular castings with the desired nodular micro-structure in the as-cast form without additional heat or other treatment.

It should also be noted that the direct reduction of iron ore, in accordance with this invention in smelting furnace 10, may, in some instances preferably, be preceded by a heating or cooking of the raw iron ore with coal or coke or some similar reducing material in a preheating furnace to a temperature range of, perhaps, 1750° F.—i.e., substantially less than the temperatures which obtain in a conventional foundry direct arc furnace—and such preliminary reducing treatment is believed to produce perhaps 80% to 90% of the ultimate reduction from the oxide of iron ore to the elemental ferrous metal. Additionally, if the preheating range is raised to, perhaps, 2000° F., it is believed that virtually the entire amount of reduction from the oxide is obtained, although, of course, such arrangement may be commercially undesired in some instances.

The foregoing is noted, particularly with regard to continuous operation of a system embodying or for practising this invention, with regard to the possibility of heating substantial quantities of ore with a reducing material in a conventional heat treating furnace at 1750° F. to 2000° F. as a preliminary step to introducing portions of such pretreated material into smelting furnace 10—both as an aid to maintaining a continuity of production of molten metal from smelting furnace 10 and, as will be understood, as a means of utilizing less expensive heating apparatus and heat sources of energy for preliminary reduction of ore to be treated prior to the final introduction thereof for final smelting and melting and introduction into the continuous aspects of the nodular iron refining and founding operations heretofore disclosed as exemplifying the preferred steps and elements of a system embodying and for practicing this invention.

It may also be that, particularly with some types of ores, that the prereduced material may be interjected directly into the refining step of furnace 20 for satisfactory results, and such operations may be preferred, as will be understood, particularly when they may admit of a reduced temperature in refining furnace 20. That is, just as a molten pool of metal 13 is preferred in smelting furnace 10 so that heat exchange is enhanced directly from the molten pool of metal to the ore layer 14 for satisfactory operation with a lower temperature than might obtain with directing arcing between electrodes 12 and the ore layer 14 which might, possibly, reduce an excessive amount of silicon, so also some similar advantage may be obtained by undertaking a preliminary part of the direct reduction at substantially lower temperatures prior to introducing the reduced material into a melting temperature range in either smelting furnace 10 or refining furnace 20. By the same token, after direct reduction and the slag or refining treatment in furnace 20, satisfactory results are also achieved according to this invention if the thus treated metal is cast into pigs or otherwise reserved for later remelting in the actual founding or casting step, and the enhanced responsiveness of thus treated metal to various nodularizing agents has been found to be maintained, whether directly introduced from the smelting and/or refining furnaces to the ladle for immediate nodularizing treatment or whether cast into pigs for later remelting to be founded and cast with nodularizing treatment; provided, of course, that the remelting operation is conducted under such conditions, as well known, as will not during the remelting operation interject into the responsive mix contaminants or materials which will have a supervening limiting effect (e.g., excessive amounts of sulphur, etc.) on the nodularizing potential of the treated metal.

As illustrative of various conditions and steps embodying and for practicing this invention with which satisfactory results have been obtained, the following may be noted:

*Example I*

A pelleted charge of taconite iron ore (comprising substantially $Fe_3O_4$) in an amount of approximately 180 parts by weight was admixed with 54 parts by weight of lime (calculated as CaO), 69 parts coke, and 15 parts fluorspar, and added into a smelting arc furnace such as 10. The charge was continuousuly added and taps of molten metal were more or less continuously made from the furnace at various times, from which conventional "keel blocks" were cast, the various taps being approximately 25 pounds each and being made at approximately two hour intervals. Samples of such treatment tapped from smelting furnace 10 (i.e., without the slag treatment indicated in furnace 20 and without nodularizing treatment) analyzed as containing approximately 3.56% carbon, 1.77% silicon, and 0.006% sulphur. After treatment (as by a ladle addition) with a nodularizing agent comprising 1.25% by weight of a mixture of calcium silicide and rare earth fluoride (such as disclosed in the copending application of Lester C. Crome, S.N. 640,624, filed February 18, 1957), in a ratio of four parts calcium silicide to one part rare earth fluoride plus an extra silicon addition of 0.5% silicon, castings made therefrom, in addition to having a desirably uniform and complete nodular microstructure, were also found to have, upon testing by the conventional physical testing methods of the foundry industry, a Brinell hardness number of 149, and ultimate tensile strength of about 62,800 pounds, and an elongation of 19%.

*Example II*

As illustrative of the prereduction or pretreatment technique mentioned, a run was made in which an iron ore (comprising essentially $Fe_2O_3$), known as Humbolt concentrate, was preheated for five hours at approximately 1750° F. admixed with powdered coal at the ratio of 78 parts by weight ore to 22 parts by weight powdered coal. After the five hour period, the ore was substantially 89% reduced, and about 108 parts by weight of the thus reduced ore were admixed with 32.5 parts by weight lime (calculated as CaO), 10 parts by weight coke, and 10 parts by weight fluorspar in an electric arc smelting furnace as indicated at 10 in the drawing. Melted and reduced taps of molten metal continuously withdrawn from furnace 10 analyzed to show a carbon content of approximately 3.09%, a silicon content of approximately 5.33%, and a sulphur content of about 0.004% before any nodularizing treatment. Taps of this metal were treated by a ladle addition of 1% by weight of nodularizing addition treatment followed by 0.5% silicon, with the nodularizing agent comprising 4 parts by weight of calcium silicide to 1 part by weight of rare earth fluorides. One-inch "keel blocks" cast from the thus treated melt showed a Brinell hardness number of 269, an ultimate tensile strength of 92,800 pounds, and an elongation of 1% (although, as will be understood, the latter physical property was somewhat diminished by the high silicon content of the original melt).

As will be apparent from the foregoing, the reduction and other pretreatment prior to nodularizing is achieved according to this invention directly from the iron ore in a manner to produce a molten or meltable pig iron mix of enhanced responsiveness to nodularizing treatment in the ladle 40. In some commercial installations, and particularly for continuous operation, it may, indeed, be preferred to produce some substantial or preponderant amount of the necessary reduction of the ore, mixed with coal or coke or some similar reducing agent, in a heat treating furnace at less than melting temperatures prior to introduction for a final smelting and melting step into furnace 10, and particularly is this true where it is desired to reduce the amount of time spent in the more expensive direct arc atmosphere of furnace 10. For example, as illustrative of some of the results according to this invention, it has been found that it may require as much as 7¾ hours' melting and reduction time in the arc atmosphere of smelting furnace 10 to reduce and melt a charge of previously untreated iron ore (either hematite or magnatite) of, approximately, 78 parts by weight, whereas, by comparison, 92 parts by weight of a similar ore previously subjected to a five- or six-hour pretreatment admixed with a reducing agent at a temperature range of no more than 1750° F., is satisfactorily reduced to the desired molten metal after only about 5¼ hours' exposure to the high temperature and intensity arc treatment in a smelting furnace such as is indicated at 10.

Accordingly, as will be seen by the foregoing, a system and methods and apparatus are provided by this invention for the production of a molten mix of enhanced susceptibility and responsiveness to nodularization in the iron foundry directly from iron ore by either batch or continuous processing and without the conventional blast furnace techniques and/or the impurities (some of which are inimical to nodularization) and/or other composition variables normally forming a concomitant of pig iron production. Furthermore, such extra responsiveness is incorporated according to the teachings of this invention for immediate use of the molten mix in the formation of nodular iron or for producing an enhanced responsiveness in a mix which may be cast into pigs for later remelting, and particularly is this true with the utilization, either originally or upon remelting, of a reducing calcium slag treatment, especially when the stone or carbonate portion of the slag is especially selected to be high in calcium content.

Similarly, a ready and continuously economical way of maintaining accurate control over the desired final composition of the melt is also provided in connection with the utilization of a refining step in furnace 20 and/or the combining with material thereof remelted material from the furnace 30. In this connection it may be noted that, particularly in mass produtcion foundry techniques where, perhaps, hundreds or even thousands of identical castings are mass produced according to a single set of specifications, the normal scrap and sprue of previous runs available for remelting may, indeed, routinely amount to as much as perhaps 50% of each heat or ladle, so that, particularly under such circumstances and with a continuous operation (whether the entire reduction is done in furnace 10 or a portion of the ore reduction is accomplished preliminarily at a lower temperature) a more or less standard or constant or continuous reservoir of the particularly responsive iron melt is available and as replenished by remelted sprue and scrap of the same composition, for economical operation to achieve in a production foundry routinely reproduceable results with a minimum of composition variation and/or nodularizing additive.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In a process for the production of nodular iron castings from a molten mix produced by the direct reduction of iron ore, the steps comprising heating said iron ore with a reducing material to form a molten iron mix, treating said molten iron mix with a slag material for enhancing the responsiveness of said mix to nodular formation while maintaining said iron in molten condition, withdrawing said thus treated molten iron from said treating step, admixing with said withdrawn molten iron a nodularizing agent, and casting said molten iron after treatment with said nodularizing agent to form said nodular iron castings.

2. In a process for the production of nodular iron castings from a molten mix produced by the direct reduction of iron ore, the steps comprising heating said iron ore in the presence of a carbonaceous reducing material to form a molten iron mix, treating said molten iron mix with a slag material including calcium and carbon while maintaining said iron in molten condition, withdrawing said thus treated molten iron from said treating step, admixing with said withdrawn molten iron a nodularizing agent, and casting said molten iron after treatment with said nodularizing agent to form said nodular iron castings.

3. In a process for the production of nodular iron castings from a molten mix produced by the direct reduction of iron ore, the steps comprising heating said iron ore with carbon as a reducing material to form a molten iron mix, treating said molten iron mix with a slag material including calcium and carbon while maintaining said iron in molten condition, withdrawing said thus treated molten iron from said treating step, admixing with said withdrawn molten iron a nodularizing agent effecting during cooling of said molten iron precipitation therein of graphite in nodular form, and casting said molten iron after treatment with said nodularizing agent to form said nodular iron castings.

4. In a process of the character described for forming a nodular-responsive molten iron mix for the production of as-cast nodular iron castings, which comprises the steps of admixing iron ore and coal, heating said admixture to a temperature less than a smelting temperature for said iron ore effecting partial reduction of said iron ore by said coal during said heating, further heating an admixture of said partially reduced iron ore and coal to a higher smelting temperature effecting complete reduction of said iron ore and production of molten iron therefrom, treating said molten iron with a slag material including calcium and carbon, withdrawing said thus treated molten iron from said further heating step to form said nodular-responsive molten mix, treating said mix with a nodularizing agent, and casting said thus treated mix to form said nodular iron castings.

References Cited in the file of this patent
UNITED STATES PATENTS

| | | |
|---|---|---|
| 1,050,736 | Hartenstein | Jan. 14, 1913 |
| 1,132,661 | Kranz | Mar. 23, 1915 |
| 2,794,731 | Iwase et al. | June 4, 1957 |
| 2,906,617 | Wahl | Sept. 29, 1959 |